May 13, 1941.  J. J. BALDINE  2,241,758
AUTOMATIC VALVE FOR HOSE NOZZLES
Filed Dec. 12, 1938
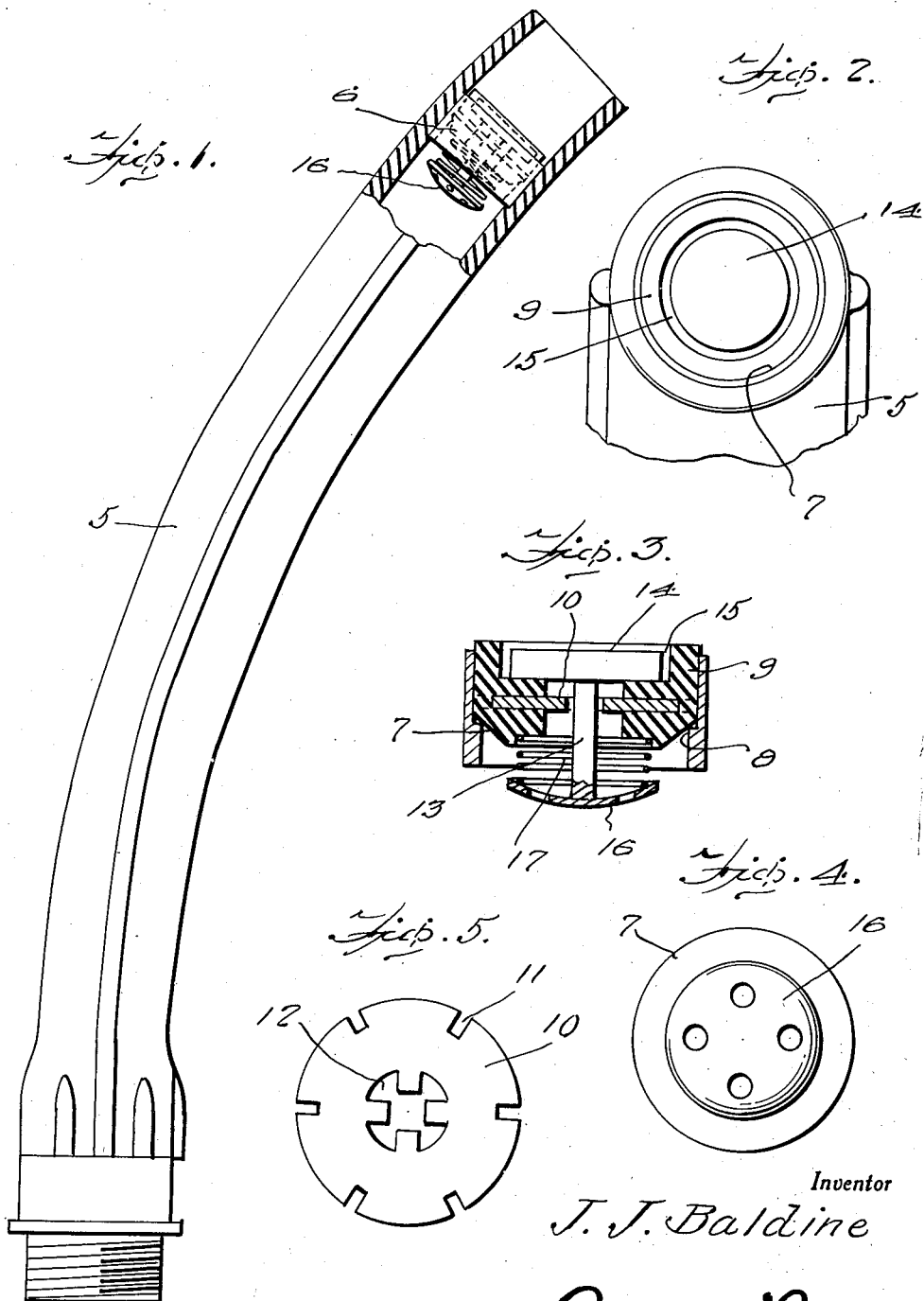
Inventor
J. J. Baldine
By Clarence A. O'Brien
and Hyman Berman
Attorneys Patented May 13, 1941

2,241,758

UNITED STATES PATENT OFFICE 2,241,758

AUTOMATIC VALVE FOR HOSE NOZZLES

Joseph J. Baldine, Hubbard, Ohio

Application December 12, 1938, Serial No. 245,249

2 Claims. (Cl. 251—144)

The present invention relates to filling hose nozzles for gasoline dispensing pumps and has for its primary object to provide pressure controlled valve means adjacent the discharge end of the nozzle to prevent dripping of the gasoline from the nozzle when the latter is removed from the neck of a gasoline tank of an automobile.

In filling nozzles of this character commonly used the hand control valve is positioned a considerable distance inwardly from the end of the nozzle which permits the dripping of the gasoline remaining in the nozzle on the fender of the automobile after the nozzle has been removed from the neck of the gasoline tank and the purpose of the present invention is to eliminate this objectionable practice.

Another object is to provide a pressure control valve structure adapted for mounting in a rubber nozzle and which is responsive to the discharge pressure of the hose to open the valve and to automatically close when the pressure is relieved as by the closing of the usual hand controlled valve.

A further object is to provide a device of this character of simple and practical construction, which is efficient and reliable in use, relatively inexpensive to manufacture and install in operation and otherwise well adapted for the purposes for which the same is intended.

Other objects and advantages reside in the details of construction and operation as more fully hereinafter described and claimed, reference being had to the accompanying drawing forming part hereof wherein like numerals refer to like parts throughout and in which—

Figure 1 is a side elevational view of a hose nozzle with parts broken away and shown in section.

Figure 2 is an end elevational view.

Figure 3 is a sectional view through the valve unit.

Figure 4 is an end elevational view of the valve unit, and

Figure 5 is a plan view of the reinforcing disk for the rubber valve seat.

Referring now to the drawing in detail, the numeral 5 designates a rubber hose nozzle of conventional construction and within which the pressure responsive valve unit 6 is mounted adjacent the discharge end of the nozzle. The unit 6 comprises a metallic sleeve 7 frictionally held in the nozzle and having an internal shoulder 8 providing an abutment for the edges of a rubber valve seat 9 snugly fitted in the sleeve and having a reinforcing disk 10 preferably molded in the rubber and having notches 11 in its periphery to expose intermediate portions of the side walls of the rubber valve seat, to the walls of the sleeve to frictionally hold the valve seat in position. The disk is provided with a central opening 12 through which the valve stem 13 is inserted to position the valve head 14 in the recess 15 at the outer end of the valve seat while the other end of the valve stem is provided with an inner perforated head 16 against which a coil spring 17 abuts for yieldably closing the valve.

In the operation of the device it will be apparent that pressure of the gasoline passing through the nozzle will open the valve against the tension of the spring to permit the discharge thereof from the outer end of the nozzle and the spring will automatically close the valve as soon as the pressure is relieved, as by the closing of the usual hand control valve (not shown) at the inner end of the nozzle.

The valve unit is positioned inwardly from the discharge end of the nozzle a sufficient distance to permit the gasoline to flow naturally therefrom without resulting in a spray caused by the valve head.

It is believed the details of construction and manner of use of the device will be readily understood from the foregoing without further detailed explanation.

Having thus described my invention, what I claim is—

1. An automatic valve of the class described comprising a removable valve unit including a metallic sleeve adapted for frictionally mounting in a tubular rubber nozzle, a rubber valve seat frictionally retained in the sleeve, an apertured reinforcing disk embedded in the seat, said disk being equal in external and internal diameters to the seat to reinforce its entire area and having peripheral notches exposing uninterrupted surface areas of the seat for frictional contact with the sleeve, said disk and seat having aligned central openings, a pressure responsive valve cooperating with the seat and having a stem slidably mounted in said opening, said valve being adapted for opening movement by pressure of fluid passing therethrough and spring means for closing the valve.

2. An automatic valve of the class described comprising a removable valve unit including a metallic sleeve adapted for frictionally mounting in a tubular rubber nozzle, a rubber valve seat frictionally retained in the sleeve, an apertured reinforcing disk embedded in the seat, said disk being equal in external and internal diameters to the seat to reinforce its entire area and having peripheral notches exposing uninterrupted surface areas of the rubber seat for frictional contact with the sleeve, said disk and seat having aligned central openings and the opening of the disk being provided with inwardly extending guide tongues, a pressure responsive valve cooperating with the seat and having a stem slidably mounted between said guide tongues, said valve being adapted for opening movement by pressure of fluid passing therethrough and spring means for closing the valve.

JOSEPH J. BALDINE.